(12) United States Patent
Adams (10) Patent No.: US 9,135,517 B1
(45) Date of Patent: Sep. 15, 2015

(54) IMAGE BASED DOCUMENT IDENTIFICATION BASED ON OBTAINED AND STORED DOCUMENT CHARACTERISTICS

(71) Applicant: Amazon Technologies, Inc., Reno, NV (US)

(72) Inventor: Jeffrey Penrod Adams, Tyngsborough, MA (US)

(73) Assignee: Amazon Technologies, Inc., Reno, NV (US)

( * ) Notice: Subject to any disclaimer, the term of this patent is extended or adjusted under 35 U.S.C. 154(b) by 205 days.

(21) Appl. No.: 13/689,151

(22) Filed: Nov. 29, 2012

(51) Int. Cl.
| | |
|---|---|
| G06K 9/66 | (2006.01) |
| G06K 9/46 | (2006.01) |
| G06K 9/64 | (2006.01) |
| G06K 9/48 | (2006.01) |

(52) U.S. Cl.
CPC .................. *G06K 9/4609* (2013.01)

(58) Field of Classification Search
None
See application file for complete search history.

(56) References Cited

U.S. PATENT DOCUMENTS

| | | | | |
|---|---|---|---|---|
| 5,724,449 A | * | 3/1998 | Cornerford | 382/230 |
| 5,832,531 A | * | 11/1998 | Ayers | 715/209 |
| 6,574,375 B1 | * | 6/2003 | Cullen et al. | 382/290 |

* cited by examiner

*Primary Examiner* — Thomas Conway
(74) *Attorney, Agent, or Firm* — Seyfarth Shaw LLP (57) ABSTRACT

A method and apparatus for identifying a document in a set of stored documents based on a pattern of characteristics in the document is presented. A digital image including at least a portion of the a document is acquired. A pattern of characteristics is then identified in the digital image. The pattern is matched to the set of stored documents to identify the document in the digital image from the set of stored documents.

28 Claims, 7 Drawing Sheets

FIG. 1

When I wrote the following pages, or rather the bulk of them, I lived alone, in the woods, a mile from any neighbor, in a house which I had built myself, on the shore of Walden Pond, in "Concord,
... — 212

Xlxx l xxxxx llx lxllxxxxg gxgxx, xx xxllxx llx lxll xl llxx, l lxxxl xlxxx, xx llx xxxlx, x xxlx lxxx xxg xxxgllxx, xx x lxxxx xlxxl l lxl lxxll xgxxll, xx llx xlxxx xl Xxllxx Xxxl, xx "Xxxxxxl,
... — 214

— 204
— 202
llxl xxxx xlx gxx gxxl xx xlxx. Xxxlx xxx xxxx lxxllx x
— 206
Xjxxxgg X xxxgxlxx xgxlxx xxx xxllxl lxx xllxxxxxllx gxxxxxxxxg x lxgxlxl xxgx xxxx xxllxx xxxlxxl xx gxxxxxxlxl. Xlx xxllxl xxxjxxxxx xxxl xl llx lxllxxxxg xx xxxxxlxl xx x xxxgxlxx. X lxgxlxl xxxgx xx xllxxxxl lxx gxxxxxxxxg. Xlxlxgxlxl xxxgx xxxlxlxx xl lxxxl xxxx xxxlxxl xxxlxllx lxx xxxxxxxxxxx xxlx xxllxx xxxlxxx. Xlx lxgxlxl xxxgx xx gxxxxxl xxlx x lxgxlxl.

Xlx xxllxl xxxjxxxxx xxxl xl llx lxllxxxxg xx xxxxxlxl xx x xxxgxlxx. Xlxgxlxl xxxgx xx xllxxxxl lxx gxxxxxxxxg.

IMAGE BASED DOCUMENT IDENTIFICATION BASED ON OBTAINED AND STORED DOCUMENT CHARACTERISTICS

BACKGROUND

Data processing techniques, such as optical character recognition (OCR), are commonly used to convert digital images of characters in documents into text data. The text data can then be manipulated and processed by word processors, web browsers and numerous other well-known applications. The accuracy of an OCR process depends on the quality and resolution of an image being converted. The use of OCR techniques to generate text data for further processing, such as performing database searches, has therefore been limited to images having relatively good resolution and image quality of the individual characters of the document.

BRIEF DESCRIPTION OF DRAWINGS

For a more complete understanding of the present disclosure, reference is now made to the following description taken in conjunction with the accompanying drawings.

DETAILED DESCRIPTION

In certain situations, a user may want to identify a book, article, or other document that may not be directly accessible to the user. For example, a user may only have access to a limited portion of the document (such as several pages of a printout or an excerpt from an unidentified newspaper article), or the user may be interested in identifying a book or periodical from a page being read by a neighboring train passenger (either in hard copy or on an electronic reader). To assist a user in these situations, a system and method is offered to identify a source document from an image of a portion of the source document. In particular, various aspects of the present disclosure allow images such as photographs of a document to be used as input for a document search. The techniques described below may be employed even when the quality of the digital image may not be good enough to perform accurate optical character recognition.

According to aspects of the disclosure, an analysis may be performed to identify characteristics in an image of a document. The identified characteristics may represent various geometric characteristics such as shapes in a portion of the document. The characteristics may include broad information such as the length of the words, word height, letter heights, letter widths, ascending letters, descending letters, text color, sentence length, lengths of paragraphs, and general print density of a sentence, for example The characteristics may also include paragraph spacing, number of paragraphs, number of columns, location of oversized text such as headings or undersized text such as footnotes, location and/or size of images or non-text data, for example. The characteristics may be used to generate a profile. According to aspects of the present disclosure, a profile may include a pattern of characteristics in a document. The profile may then be compared to characteristics of known documents to identify the document from the image of the document portion. The known documents from which a document may be identified are referred to herein in as "source documents." A pointer to the document having characteristics that most closely match the profile (or the document itself) may then be provided to a user.

Identification of characteristics in an image of a document may be performed with images (such as digital images) having lower image resolution and lower image quality than the resolution and quality sufficient to provide accurate results using conventional techniques such as optical character recognition (OCR). According to aspects of the present disclosure, a user may be able to obtain a photograph, image, or copy of a portion of a document such as a newspaper article, a technical paper, or a magazine clipping, for example, and search for the full document on the internet or some other database based at least in part on the identified pattern of characteristics of the document. In one example, a user may take a picture of a document with a digital camera to obtain an image of the document. Even if the image or copy of the document is of relatively low quality, identifying and/or obtaining the original source document may still be possible.

The following detailed description provides exemplary implementations of the disclosure. Although specific system configurations and flow diagrams are illustrated, it should be understood that the examples provided are not exhaustive and do not limit the disclosure to the precise forms disclosed. Persons having ordinary skill in the field of computers, digital imaging, and/or content conversion, will recognize components and process steps described herein that may be interchangeable with other components or steps, or combinations of components or steps, and still achieve the benefits and advantages of the present disclosure. Moreover, in the following description, numerous specific details are set forth in order to provide a thorough understanding of the disclosure. It will be apparent to one skilled in the art, however, that the disclosure may be practiced without some or all of these specific details. In other instances, well-known process steps have not been described in detail in order not to unnecessarily obscure the disclosure.

It should also be understood that the following description is presented largely in terms of logic and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

With regard to images, while a typical digital image is a raster- or vector-based file, such as JPEG and TIFF files, the present disclosure is not so limited. More particularly, in addition to processing raster- and/or vector-based images, the present disclosure may include identification of characteristics in other types of digital images, such as PDF images, that may include text and/or textual formatting characteristics, for example.

Aspects of the present disclosure may be used to find and/or retrieve a document or information about a document from a known set of documents. The known set of documents may include a database storing characteristics of multiple documents such as newspaper articles, books, academic papers, or legal briefs, for example. The database may also store the documents themselves. A user may acquire a digital image of at least a portion of a document, for example by taking a picture of the document with a camera phone. In one example, a user may photograph a portion of a legal paper in order to search for the full document or a citation to the full document. In another example, a user may be in possession of a section from an unidentified periodical (such as a historical clipping) and wish to locate the entire article or newspaper.

In one aspect, the digital image may not have sufficient resolution or quality to allow optical character recognition processing to accurately recognize the photographed text within the digital image in order to perform a text based search for the document. According to aspects of the present disclosure, a search may be performed to locate the document even if text letters cannot be recognized in the digital image by processes such as OCR.

According to aspects of the present disclosure the geometric shapes of text blocks including groups of words and letters in a document may be recognized in a digital image of the document, as described above. It should be understood that the term "word" as used herein encompasses any grouping of one or more characters, numbers, or symbols. Moreover, a word may stand alone or be associated with a non-text object, such as a picture or graphic, for example. The term "graphic" as used herein encompasses any area of the document displaying content supplementing the text of the document, such as a picture, logo, or chart. The terms "header" and "footer" as used herein encompasses areas of text located at the top and bottom of a document page, respectively, that is segregated from the main text on the page. Various characteristics such as geometric characteristics of words or blocks of text found in a digital image of a document can be used to form a profile of the image, which may then be used to identify the document represented in the image.

Figure 1:
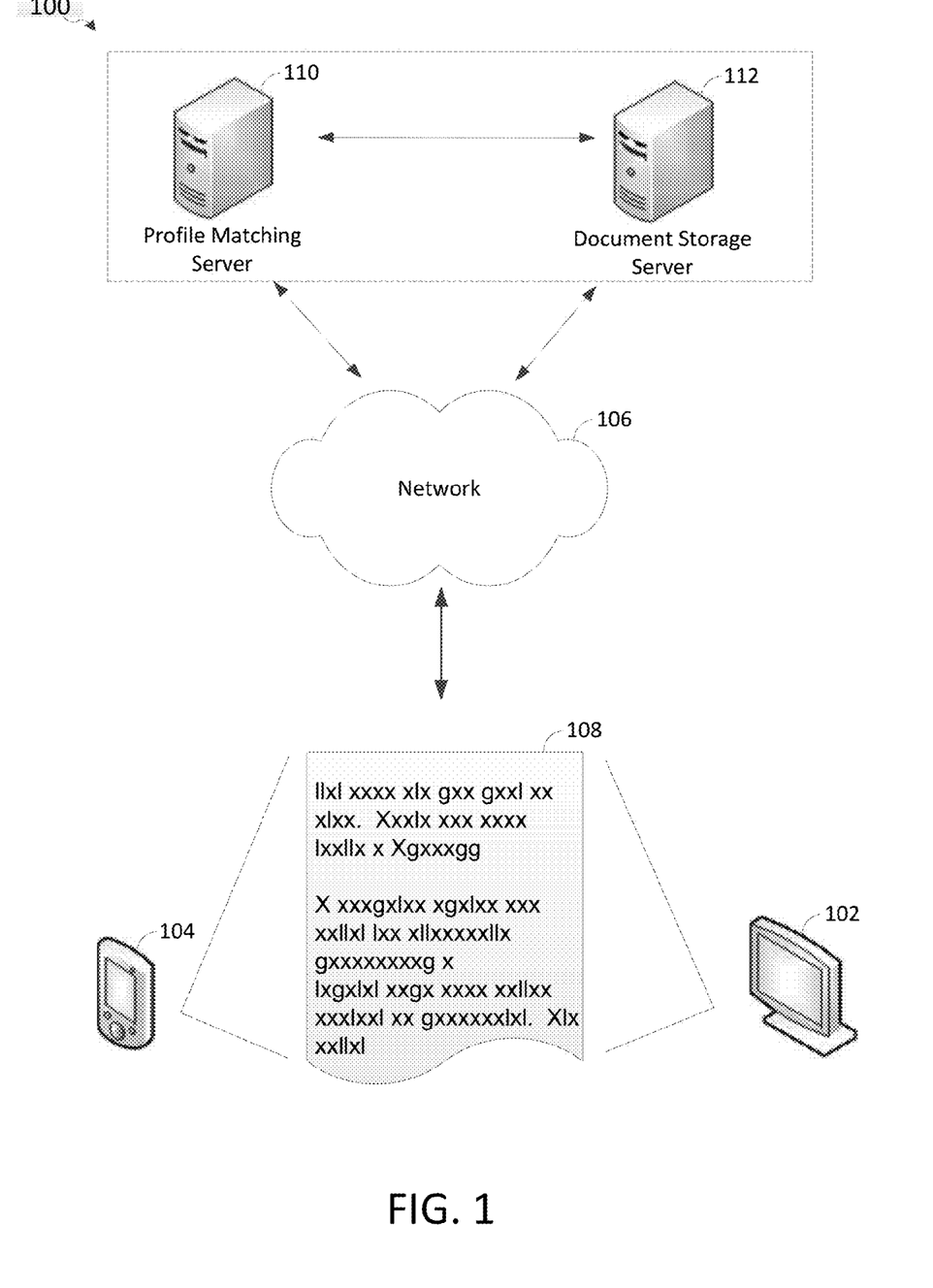
FIG. 1 is a pictorial diagram showing an environment for implementing one aspect of the disclosure.

FIG. 1 illustrates one environment for implementing an image based document identification technique according to aspects of the present disclosure. As will be appreciated, different environments may be used, as desired, to implement different aspects of the disclosure. The environment shown includes a content matching system 100 with an electronically-searchable library of content that may be accessed by multiple individual users. The environment also includes various electronic user devices, such as a computer system 102 and a wireless device 104, that individual users may use to communicate with the system 100. In the environment shown in FIG. 1, the user devices 102 and 104 communicate with the system 100 via one or more computer networks, such as the Internet 106. Communication between user devices 102 and 104 and the system 100 may also be enabled by wired or wireless computer network connections.

According to aspects of the present disclosure, a user may obtain an image of a document 108 and perform a search of the content matching system 100 to identify the source of the document using the profile matching server 110 based on the line characteristics and text shape profiles in the digital image. The image may be obtained by taking a digital picture of the document 108 or receiving a previously acquired image. Preliminary processing may be performed, for example to correct the obtained image for distortions such as distortions introduced when an image is acquired by taking a picture from an offset angle. Profiles of documents based on line characteristics, text shapes, and/or other factors, may be stored in the profile matching server 110 or other storage device. Documents themselves may be located in the document storage server 112 as part of the system 100 or may be located elsewhere. The profile matching server 110 may include links to the location of profiled documents. After identifying a source document from an image or document portion, a copy of the document may also be downloaded by the user device either from the document storage server 112 or from a different storage location. In one aspect of the disclosure the profile matching server 110 is collocated with the document storage server 112. In another aspect of the present disclosure, the source document may be delivered to the user following appropriate payment for the source document.

According to one aspect of the present disclosure, the characteristics include text characteristics such as word length (in letters or space), length of a word relative to surrounding words, letter height, letter width, ascending letters, descending letters, sentence length, paragraph size, page layout and punctuation marks. Characteristics may also include characteristics such as the location of graphics, symbols, header text, footer text, etc.

According to aspects of the present disclosure, characteristics such as word length or word height may be qualified in absolute or relative terms by determining or estimating a number of characters in a word, determining or estimating the actual word length or height in units such as inches or millimeters, and/or determining or estimating the relative length or height of a word compared to other words in the document, for example. Letter height may be qualified in terms of relative height compared to average letter height in a document or compared to a base character height, for example.

In one example, for a particular document portion that is of moderate quality, a profile matching server 110 may identify that one line in the image includes words that are all five or more characters and two words with hyphens. In another example, for a particular document portion that is of lower quality, the profile matching server 110 may identify that the document portion includes two graphics in an upper-left hand portion of a page as well as two approximately equal sized paragraphs in a bottom-right hand portion of a page along with text in a footer with three words in the center of the page. Characteristics may be determined on any combination of the word level, line level, paragraph level, page level, etc. Further, various combinations of techniques may be applied over a single document multiple times in an attempt to locate a source document. More detailed examples are discussed below.

Figure 2:
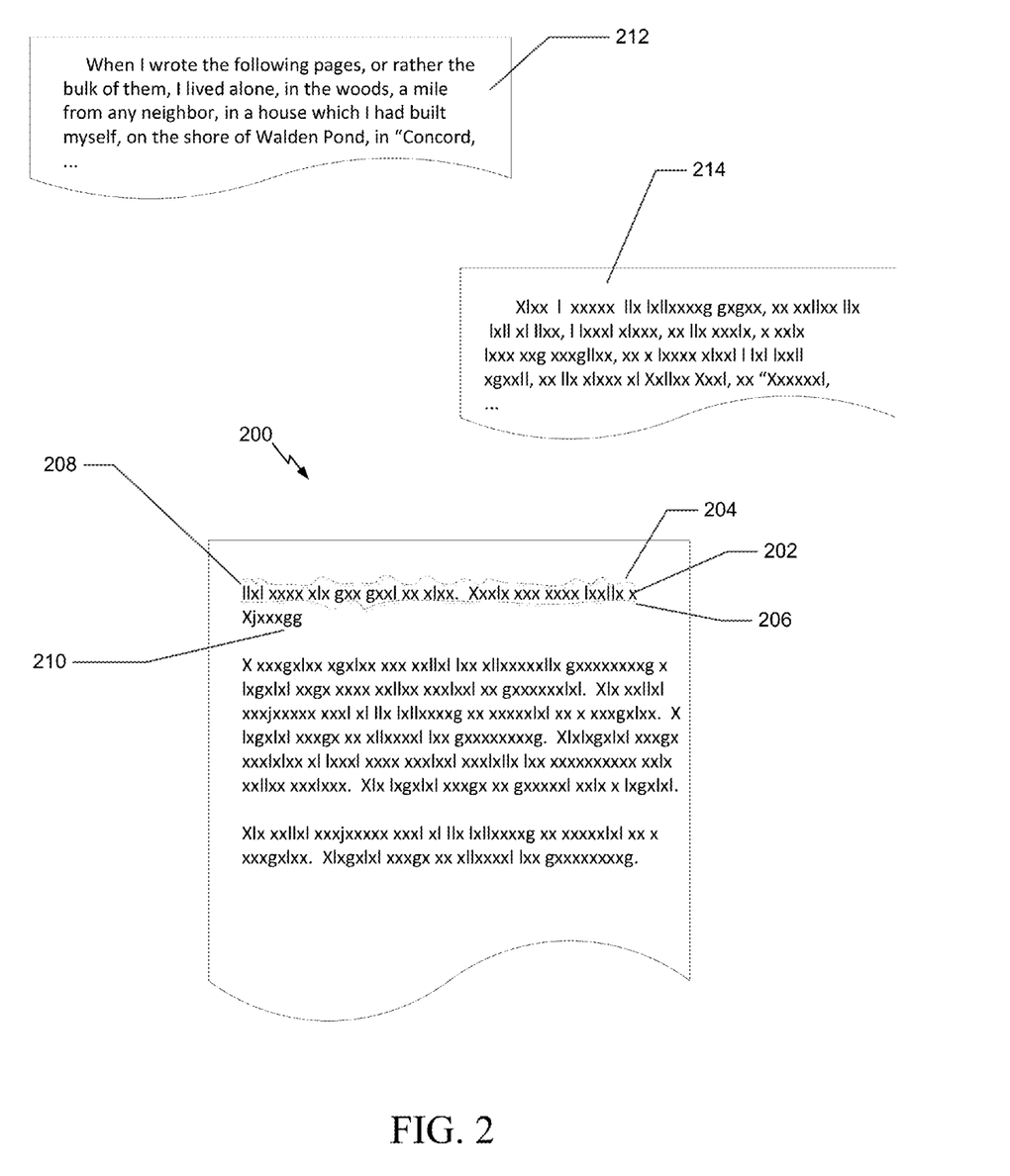
FIG. 2 is a pictorial diagram illustrating a digital image of a printed page of content including a pattern of characteristics according to aspects of the present disclosure.

An example of an image of at least a portion of a document including characteristics according to aspects of the present disclosure is described with reference to FIG. 2. As used herein, a portion may include a limited section of a source document, or the source document in its entirety, for example a complete but unidentified newspaper article that is contained entirely in a single image. FIG. 2 shows a number of ascending characters 208 and a number of descending characters 210. The term "ascending" as used herein refers to letters or characters that extend into a space above a line of text such as "b", "d", "f", and "l" for example. The term "descending" as used herein refers to letters or characters that extend into a space below the line of text, such as "g" and "q" for example. The term "mean height" characters refers to characters such as "a" or "x" which are neither descending nor ascending. According to one aspect of the present disclosure, a pattern of characteristics includes the frequency of occurrence and/or relative spacing of ascending, descending and/or mean height characters in the digital image. Various other categories of characters may be included in a pattern according to aspects of the present disclosure including dotted characters such as "i" or "j" and wide characters such as "w" majuscule characters, miniscule characters, upper case characters and lower case characters, for example. In the document portion of FIG. 2, ascending characters are represented by the character "l", descending characters are represented by the character "q", upper case characters are represented by the character "X" and mean height characters are represented by the character "x." In an example of text shown in FIG. 2, the first portion of text 212 may be represented by the first pattern of characteristics 214, for example.

In the example of FIG. 2, another pattern of characteristics that may be used to uniquely identify the source document among a stored set of documents includes a letter height pattern along lines of text in the image. The top edge pattern 204 represents a series of text heights along a top edge of a sequence of letters 202 in the digital image of document 200, for example. Such a pattern having a sufficient length provides a signature that creates a profile for the document portion which may then be compared to stored document profiles to identify the source document from which the portion was taken. Similarly, a pattern including a series of text heights along a bottom edge of the sequence of letters may be used according to another aspect of the disclosure. The bottom edge pattern 206 represents a series of text heights along a bottom edge of the sequence of letters 202 in the digital image of document 200, for example. In another embodiment, a pattern can be obtained by combining the top edge pattern 204 bottom and the bottom edge pattern 206 to generate a profile of the document portion and identify the source document.

As described above, various character classes may be defined and identified as characteristics according to aspects of the present disclosure. For example, one class of characters representing a characteristic may include only small letters such as lower case "a" and lowercase "e" for example. Another class of characters representing a text characteristic may include only large letters such as uppercase "X" and "W", for example. According to aspects of the present disclosure, a pattern of characteristics may include sequence of letters in the image that are identified as a sequence of small letters and large letters. In a particularly blurry image, such patterns may provide a sufficient signature for uniquely identifying the source document from a stored set of document profiles.

An image of a document may include identifiable page level features such as margins, paragraph formats, titles, page headers and page footers, for example. These identifiable page features may also be included in the corresponding profile of the source document. For example, if the digital image is acquired by taking a digital photograph of a copy of the document that is virtually identical to the stored document, then the same page features may be included in the digital image and in the stored document. This may occur, for example, when a train passenger is interested in identifying a document being read by a neighbor and takes a picture of the document for identification by the content matching system. In these instances, the pattern of characteristics that may be used to identify the document in the stored documents according to aspects of the present disclosure may include page features such as margin widths, graphic layout, bold heading locations and oversize font heading locations, for example.

Figure 3A:
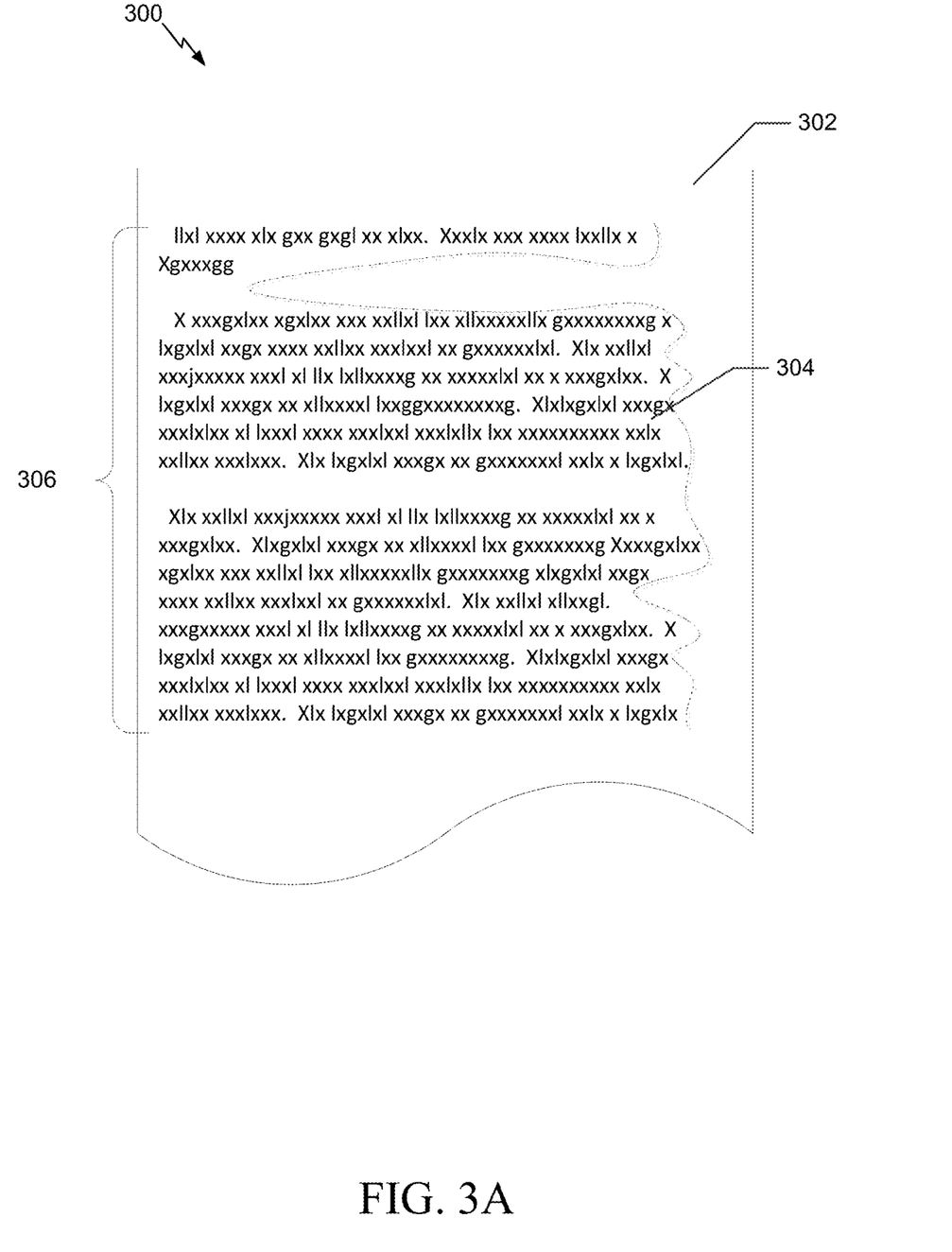
FIG. 3A is a pictorial diagram illustrating a digital image of a printed page of content including page features in a pattern of characteristics according to aspects of the present disclosure.

FIG. 3A shows a digital image 300 of a document 302 including identifiable page features that may be included in a pattern of characteristics for identifying a document according to aspects of the present disclosure. The pattern includes a right edge pattern 304 representing sequence of horizontal positions of the end of lines of text 306 on the page. Although FIG. 3A illustrates the right edge pattern 304, aspects of the present disclosure also may include identifying a left edge pattern, in which one characteristic may include whether a first line of a paragraph is indented, for example. Such a pattern having a sufficient length may provide a signature that may be used to identify the document.

Figure 3B:
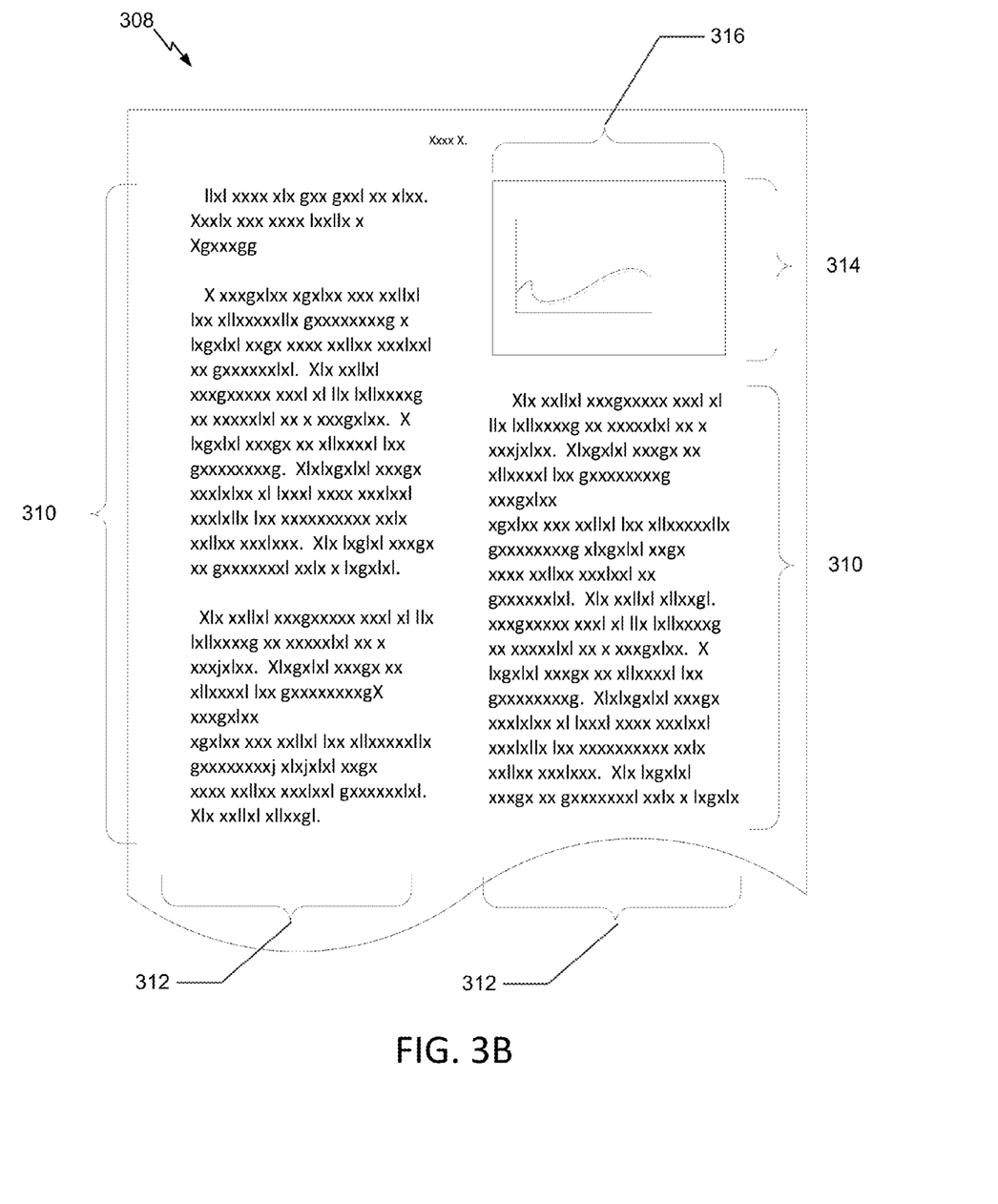
FIG. 3B is a pictorial diagram illustrating a digital image of a multi-column document illustrating page features in a pattern of characteristics according to aspects of the present disclosure.

FIG. 3B shows an example in which a digital image of a document 308 includes multiple columns of text and a graphic. According to aspects of the present disclosure, characteristics for identifying the document may include page features such as column height 100, column width 312 graphic height 314, and graphic width 316, for example. Additional features such as spacing between columns, margin size, paragraph size and whether the first line of a paragraph is indented may also be used as characteristics for identifying the document according to aspects of the present disclosure. However, it should be understood, that if the stored document does not include the same page formatting as the photographed copy of the document in the digital image, then the pattern of characteristic used for identifying the document may not include certain page features such as a right edge pattern 302 or other page formatting such as paragraph formats, graphic layout bold heading locations and oversized font heading locations, for example. Images of text that may not be suitable for searching based on page feature patterns according to aspects of the present disclosure include images of text obtained via web browser, for example, in which formatting is often altered for presentation on a computer display. However, even images that include altered formatting may be identified based on patterns of characteristics such as such as word length, letter height, letter width, ascending letters, descending letters, sentence length, paragraph size, paragraph spacing, margin size and/or alignment, page layout and/or punctuation marks according to aspects of the present disclosure as described with reference to FIG. 2, for example.

According to another aspect of the disclosure, a set of characteristics may be defined by performing a preliminary feature extraction process based on the stored set of documents or document profiles. The feature extraction process may identify various characteristics that may be represented mathematically, for example, but may not necessarily be describable in terms of apparent text features. The preliminary feature extraction process may be performed in a similar manner as feature extraction processes performed in training processes of various speech recognition systems, for example. Once the set of characteristics is defined by the preliminary feature extraction process, patterns of such features may be compiled into a profile and used to identifying a matching source document or document profile according to aspects of the present disclosure According to another aspect of the present disclosure a pattern of characteristics may be supplemented by additional information to perform more efficient document searching. The additional information may include text that has been identified by other means such as OCR, for example. In one example, the digital image may include some text that is presented in a relatively large font such as an author's name, or a chapter heading that can be recognized by an OCR process. According to this aspect of the disclosure, after the OCR process is performed to identify a portion of the text in the document, a subset of documents that include the portion of text is identified in the set of stored documents. Then the document that includes the pattern of characteristics is identified in the subset of documents. In another example, after an OCR process is performed, additional processing may be performed to supplement an OCR result based on the confidence level of recognized characters. In this example, when confidence in an OCR recognized character is below a predetermined threshold, for example, characteristics of the character such as ascending, descending, mean height, or uppercase may be included in a pattern to supplement the OCR recognized text.

Other information that may be used to supplement the pattern of characteristics in a digital image of a document for identifying the document in a set of documents according aspects of the present disclosure include page number information. For example, in many cases the digital image may capture the front page of a document. The image may be recognized as a front page image by identifying certain features that are common to the front page of a document. Such features may include a large font title for example. Once the image has been recognized as a front page image, the document search may be conducted by searching (at least in one stage) only front pages of the stored set of documents for the identified pattern of characteristics, for example.

According to another aspect of the disclosure, the document search may be reduced by performing two or more consecutive searches. For example, according to this aspect of the disclosure, a subset of documents that includes a first portion of the pattern characteristics can be identified. Then the document that includes a second portion of the pattern of characteristics can be identified in the subset of documents. In another aspect, first a portion of text in the image may be recognized according to an OCR process. Then a subset of documents including that text may be identified. From that subset, a source document for the image may be identified using the characteristics. In these aspects a search may be conducted iteratively to isolate different characteristics that match the image to a source document. Iterative processing in this and other aspects may allow for identification of a source document in a more efficient manner.

According to an aspect of the present disclosure, different types of characteristics identified in a digital image may be selected based on the quality and/or resolution of the image. For example, in a moderately blurry image, a pattern of characteristics including a top edge pattern 204 and a bottom edge pattern 206 may be selected for use to identify the document according to aspects of the present disclosure as described herein with reference to FIG. 2. In a very blurry image, the top edge pattern 204 and bottom edge pattern 206 may not be recognizable, so a pattern of characteristics including a right edge pattern 302 may be selected for use to identify the document according to aspects of the present disclosure as described herein with reference to FIG. 3. In this manner the characteristics to be searched may be based at least in part on the image quality.

Once a pattern of characteristics is extracted from a digital image according to aspects of the present disclosure, various well known search algorithms may be employed to efficiently find matching patterns within the set of stored documents to identify the document represented in the digital image. Such search algorithms may include pattern matching algorithms, string search algorithms, binary search algorithms, hash algorithms, and fuzzy matching algorithms, for example. Various fuzzy matching algorithms may be employed for finding inexact matching patterns within the stored documents according to aspects of the present disclosure, in which the inexact matching may be sufficient to identify the document represented in the digital image.

Figure 4:
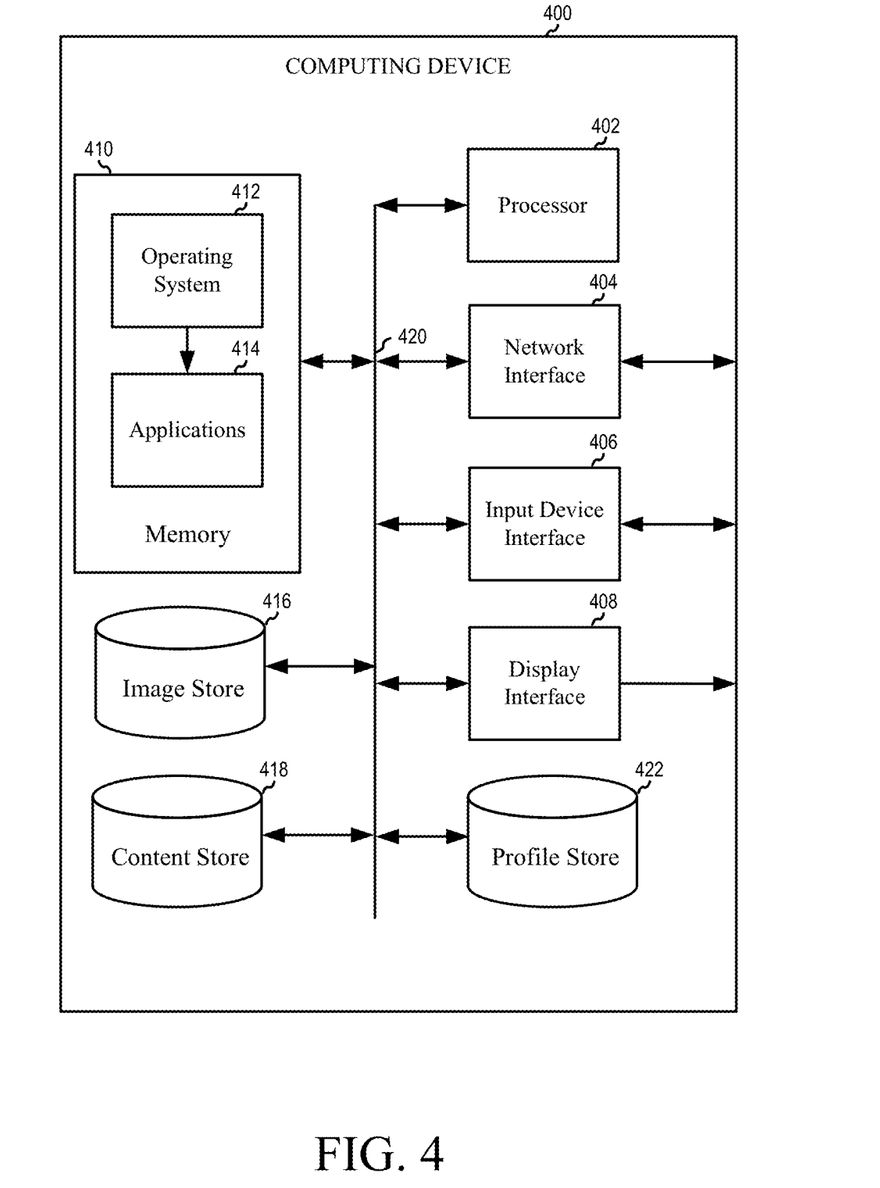
FIG. 4 is a block diagram depicting an arrangement of certain computing components for implementing aspects of the present disclosure.

Processing images according to various aspects of the present disclosure may be conducted on a variety of computing devices and configurations. These computing devices include, but are not limited to, laptop or tablet computers, personal computers, workstations, mini- and mainframe computers, servers, and the like. These computing devices may also include specially configured computers for processing digital images. The general architecture of a suitable computing device is described below in regard to FIG. 4. More particularly, FIG. 4 is a block diagram illustrating exemplary components of a computing device 400 suitable for processing a digital image. However, the following description of the exemplary components of a computing device 400 should be viewed as illustrative only and not construed as limiting in any manner. In one aspect, the profile server 110 or document server 112 may be implemented as a device illustrated in FIG. 2. In another aspect, the user device 102 or 104 may be implemented as a device illustrated in FIG. 2.

With regard to FIG. 4, the exemplary computing device 400 may include a processor 402 in communication with a variety of other components over a system bus 420 or through a direct connection. These other components may include, by way of example, a network interface 404, an input device interface 406, a display interface 408, and a memory 410. As appreciated by those skilled in the art, the network interface 404 enables the computing device 400 to communicate data, control signals, data requests, and other information with other resources including computers, data sources, storage devices, and the like, on a computer network such as the Internet. The network interface 404 may be configured to communicate via wired or wireless connections. As one skilled in the art will appreciate, the computing device 400 may obtain a digital image, such as digital image 108 from another computer, a storage device, or other source via the computer network, as well as save the processed converted content to a networked location or send it to another computer on the network.

The input device interface 406, sometimes also embodied as an input/output interface, enables the computing device 400 to obtain data input from a variety of devices including, but not limited to, a digital pen, a touch screen, a keyboard, a mouse, a scanner, and the like. In addition to the exemplary components described above, a display interface 408 may be used for outputting display information to a computer user. Typically, the display information is output by the display interface 408 via a display device (e.g., a monitor or similar device). Of course, while not shown, one skilled in the art will appreciate that a display device may be incorporated as an integral element within a computing device 400 or may be separate therefrom.

The processor 402 may be configured to operate in accordance with programming instructions stored in a memory 410. The memory 410 generally comprises RAM, ROM, and/or other memory. Thus, in addition to storage in read/write memory (RAM), programming instructions may also be embodied in read-only format, such as those found in ROM or other permanent memory. The memory 410 may store an operating system 412 for controlling the operation of the computing device 400. The operating system may be a general purpose operating system such as a Microsoft Windows operating system, a UNIX operating system, a Linux operating system, or an operating system specifically written for and tailored to the computing device 400. Similarly, the memory 410 may also store user-executable applications 414, or programs, for conducting various functions on the computing device 400. For example, the application 414 in memory 410 may be configured according to aspects of the present disclosure to process a digital image 108.

The computing device 400 optionally includes an image store 416, a content store 418, and/or a profile store 422, depending on how the computing device 400 is to be used. For example, if the computing device 400 is a user device 102 and/or 104 it may include the image store 416 and the content store 418. If the computing device 400 is a profile matching server 110 it may include the image store 416 and profile store 422. If the computing device 400 is a document storage server 112 it may include the content store 418.

For a user device 102 or 104, the image store 416 may store digital images of document portions for recognition processing. As the image store 416 is optional, the digital image may be obtained from a scanner, camera, or other image capture device connected to the input device interface 406, or from an external source via the network interface 404. Once the digital image is processed and the source document is recognized, the source document may be downloaded onto the computing device 200 and stored in the content store 418. The content store may be viewed as optional as the resultant digital content may be immediately sent to a display device via the display interface 408, streamed to a user's computer, or to an external location or resource for storage via the network interface 404.

For a profile matching server 110, the image store 416 may store digital images of document portions for recognition processing that are uploaded by users. The profile store 422 may include stored profiles of documents which may be compared to the profiles of images provided to the profile matching server 110. The applications 414 of the profile matching server 110 may include software and components for performing profile searching and comparisons based on search techniques, which are known and are beyond the scope of the present disclosure.

For a document storage server 112, the content store 418 may include stored documents to be identified by the profile matching server 110 and/or sent to a user device 102 and/or 104 after identification.

A digital image processing system suitable for processing a digital image according to aspects of the present disclosure may be implemented in a single application or module implemented on a computing device 400, in a plurality of cooperating applications/modules on a single computing device, or in a plurality of cooperating applications and/or modules distributed in a computer network.

Figure 5:
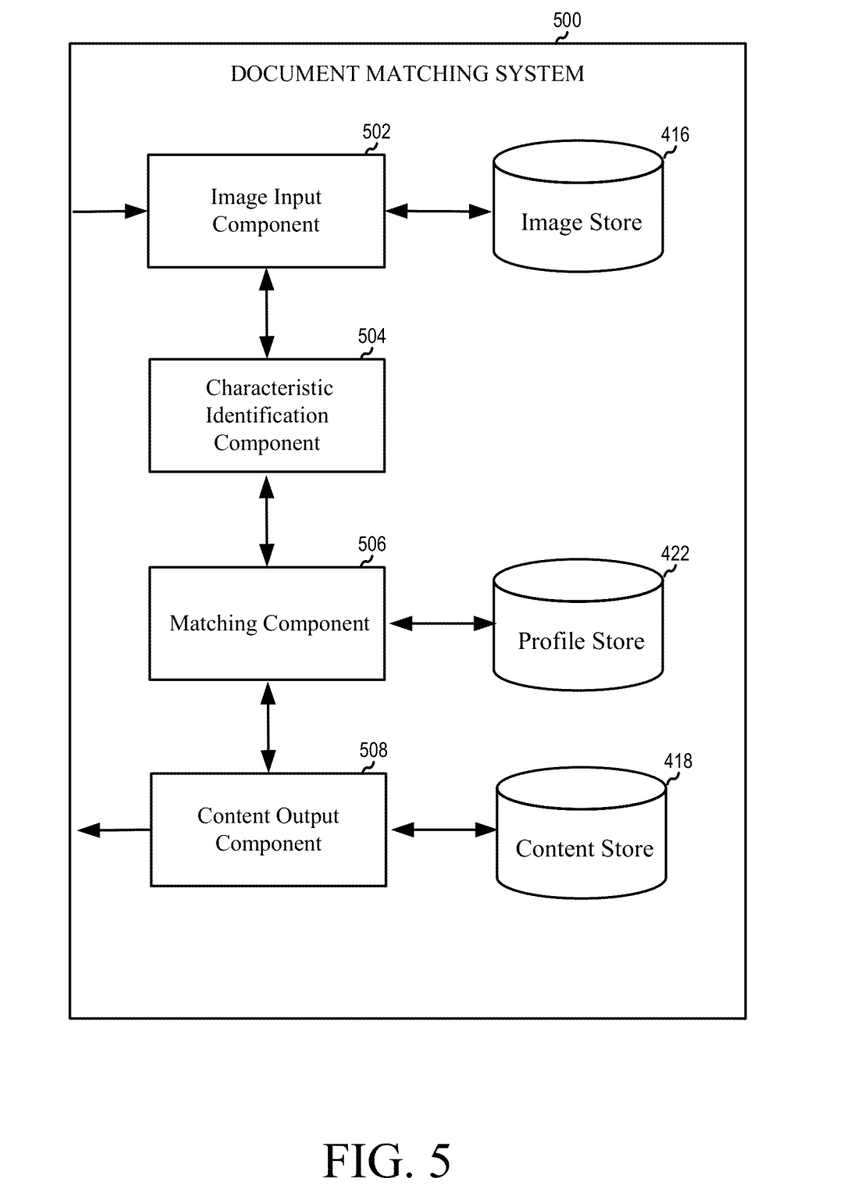
FIG. 5 is a block diagram illustrating logical components of a digital image processing system for identifying or retrieving a document by identifying characteristics in an image of a portion of the document according to aspects of the present disclosure.

A digital image processing system suitable for identifying patterns of characteristics in a digital image of a document may be implemented in a single application or module implemented on a user device 102 or 104, profile matching server 110, in a plurality of cooperating applications/modules on a single computing device, or in a plurality of cooperating applications and/or modules distributed in a computer network, for example. Components of the document matching system may be identified with regard to various logical components. To that end, FIG. 5 is a block diagram illustrating logical components of a document matching system 500 for identifying and/or retrieving a document by identifying patterns of characteristics in an image of a document according to one aspect of the present disclosure. Similarly, FIG. 6 is a flow diagram illustrating an exemplary routine 600 for identifying or retrieving a document in a data store by identifying patterns of characteristics in an image of a document using, for example, one or more of the logical components of FIG. 5.

It should be noted that for illustration purposes the illustrated document matching system 500 (FIG. 5), includes the image store 416 and the content store 418. As discussed above, however, inclusion of the image store 416 and the content store 418 is exemplary/optional, as the document matching system 500 may obtain a digital image from local storage (e.g., the image store 416), a network source, or digital image generating device such as a scanner, a digital camera, and the like. Similarly, the document matching system 500 may output the retrieved digital content to local storage (e.g., the content store 418), a network source, or stream it to a user immediately for display/consumption. Thus, while the subsequent description of the document matching system 500 and routine 600 is made with regard to both the image store 416 and the content store 418, it is for simplicity and clarity in description only and should not be construed as limiting upon the present disclosure.

Figure 6:
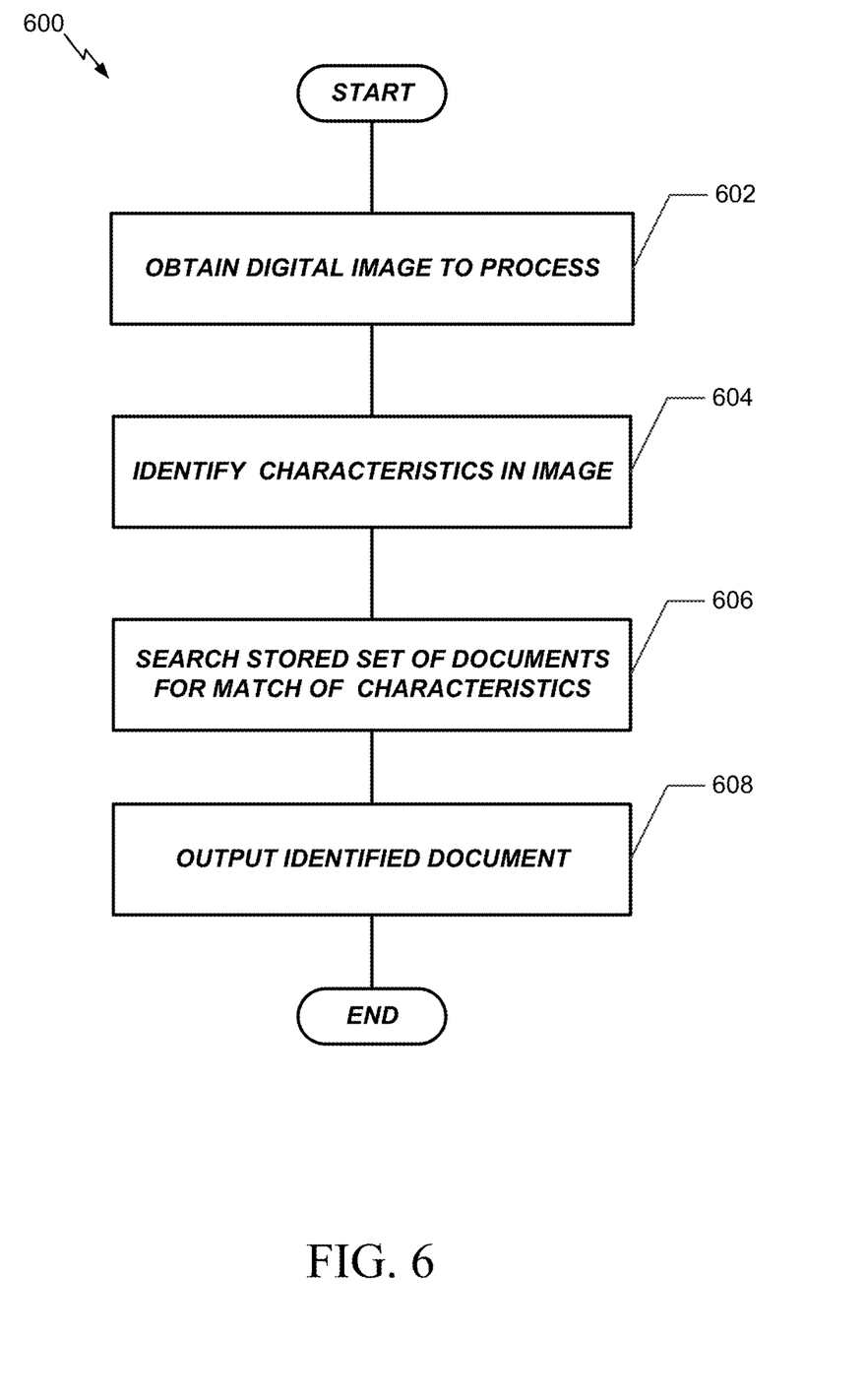
FIG. 6 is a flow diagram illustrating an exemplary routine for identifying or retrieving a document by identifying patterns of characteristics in an image of a portion of the document according to aspects of the present disclosure.

With regard to the exemplary routine 600 of FIG. 6, and with further reference to the document matching system 500 of FIG. 5, at block 602, the image input component 502 obtains a digital image of content including at least a portion of a copy of a document, for example. As shown in FIG. 5, in an illustrative embodiment, the image input component 502 obtains the digital image from the image store 416. As noted, however, the image may be obtained from a variety of sources, including a picture taken from or document scanned into a user device 102 or 104.

At block 604, the document matching system 500, via the characteristic identification component 504, identifies one or more characteristics in the image, as described above. From the characteristics, a profile of the image may be created. According to aspects of the present disclosure, the identification of characteristics in an image may also be performed by a client device such as the user device 104 (FIG. 1). The characteristics may be sent from the client device to the document matching system 500, for example. This reduces bandwidth compared to sending the image from the client device to the document matching system, for example At block 606, the document matching system 500, via a profile matching component 506, searches the profile store 422 to identify one or more documents whose profiles match the profile of the image. In another aspect of the system a profile store 422 may not be used and instead the profile of the image is compared to documents contained within the content store 418 or different storage locations. For example, a search engine may dynamically search a network, for example the Internet, for documents which match the profile of the image.

At block 608, the document matching system 500, via a content output component 508, outputs the identified document or documents from a content store 418 to a desired user. In one aspect, if a document is not available to the system 500, the content output component 508 or similar component may output to a user a link to the document at another storage location, or information about the identified document, such as the identified document's identity, location, or availability to purchase. After sending by the content output component 508, the exemplary routine 600 terminates.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java, C, C# or C++, or any scripting language, such as Perl, Python, or TCL, as well as combinations thereof. The server(s) may also include database servers, including without limitation those commercially available from Oracle, Microsoft, Sybase, and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A system for identifying a source document from an image, comprising:
 a processor;
 a memory device including instructions operable to be executed by the processor to perform a set of actions, configuring the processor:
  to obtain an image of at least a portion of a document;
  to process the image to determine a plurality of image characteristics of the image, wherein the plurality of image characteristics comprise a first image characteristic representing ascending letters in the image, a second image characteristic representing descending letters in the image, a third image characteristic representing a number of letters in a word in the image and a fourth image characteristic representing a number of words in a line of text in the image;
  to compare the plurality of image characteristics to document characteristics of a first previously stored source document and a second previously stored source document, wherein the document characteristics comprise a first document characteristic representing ascending letters in a document, a second document characteristic representing descending letters in a document, a third document characteristic representing a number of letters in a word in a document and a fourth document characteristic representing a number of words in a line of text in the document;

to select the first source document based at least in part on the image characteristics and the document characteristics; and to send information about the first source document to a user.

2. The system of claim 1, wherein the plurality of image characteristics further comprise:
a fifth image characteristic representing majuscule letters in the image,
a sixth image characteristic representing a number of lines in a paragraph in the image, and
a seventh image characteristic representing a number of lines in a page in the image.

3. The system of claim 1, wherein the plurality of image characteristics further comprise:
a margin width in the image,
information about a graphic in the image, and
information about a header or a footer in the image.

4. The system of claim 1, wherein the processor is configured to select the first source document using a fuzzy matching technique.

5. A method, comprising:
obtaining an image of at least a portion of a document;
processing the image to determine a plurality of image characteristics of the image wherein the plurality of image characteristics comprise at least one of a first image characteristic representing ascending letters in the image, a second image characteristic representing descending letters in the image, a third image characteristic representing a number of letters in a word in the image and a fourth image characteristic representing a number of words in a line of text in the image; and
identifying a previously stored source document based at least in part on the plurality of image characteristics.

6. The method of claim 5, further comprising identifying a location of the identified source document.

7. The method of claim 5, wherein the plurality of image characteristics comprises at least one of:
a fifth image characteristic representing a margin width in the image,
a sixth image characteristic representing information about a graphic in the image, and
a seventh image characteristic representing information about a header or a footer in the image.

8. The method of claim 5, wherein identifying the source document further comprises using a fuzzy matching technique on the plurality of image characteristics and characteristics of the source document.

9. The method of claim 5, wherein the plurality of image characteristics comprises:
a series of relative text heights along a top edge of a sequence of characters in the image.

10. The method of claim 5, in which the plurality of image characteristics comprises:
a fifth image characteristic representing word length of words in the image in standard units of length;
a sixth image characteristic representing word length proportional to word heights of words in the image;
a seventh image characteristic representing letter height in standard units of length of letters in the image; and
an eighth image characteristic representing letter height proportional to an average letter height of letters in the image.

11. The method of claim 5, in which the plurality of image characteristics comprise a fifth image characteristic representing a classification of similarly shaped letters in the image.

12. The method of claim 11, in which the classification of similarly shaped letters in the image is in a group consisting of ascending characters, descending characters, mean height characters, dotted characters, majuscule letters, miniscule letters, upper case letters and lower case letters.

13. The method of claim 5, in which the plurality of image characteristics comprise page layout information of a page in the image.

14. The method of claim 13, in which the page layout information comprises one or more of a margin width, graphic layout, and heading location.

15. The method of claim 5, in which the plurality of image characteristics comprise page number characteristics of a page in the image.

16. The method of claim 5, in which the obtaining an image comprises receiving a digital photograph of the portion of the document.

17. The method of claim 5, further comprising:
performing optical character recognition on the image to identify text in the portion of the document; and
identifying the source document is further based at least in part on a portion of the text.

18. A computing device, comprising:
at least one processor;
a memory device including instructions operable to be executed by the at least one processor to perform a set of actions, configuring the at least one processor to:
obtain an image of at least a portion of a document;
identify a pattern of geometric characteristics in the portion of the document; and
identify a source document that includes the portion based at least in part on the pattern of geometric characteristics;
in which the geometric characteristics comprise one or more of word length, letter height, letter width, relative location of ascending characters, relative location of descending characters, sentence length, paragraph size and punctuation marks.

19. The computing device of claim 18, in which the at least one processor is further configured to identify a location of the identified source document.

20. The computing device of claim 18, in which the identifying the source document is further based at least in part on a profile including the pattern of geometric characteristics.

21. The computing device of claim 20, in which the geometric characteristics comprise a series of relative text heights along a top edge of a sequence of characters.

22. The computing device of claim 18, in which the geometric characteristics comprise a classification of similarly shaped letters.

23. The computing device of claim 22, in which the classification is in a group comprising at least one of ascending characters, descending characters; mean height characters, dotted characters, majuscule letters, miniscule letters, upper case letters and lower case letters.

24. The computing device of claim 18, in which the geometric characteristics comprise page layout information.

25. The computing device of claim 24, in which the page layout information comprises one or more of a margin width, graphic layout, and heading location.

26. The computing device of claim 18, in which the geometric characteristics comprise page number characteristics.

27. The computing device of claim 18, in which the at least one processor is further configured to receive a digital photograph of the portion of the document.

28. The computing device of claim 18, in which the at least one processor configured to identify the source document comprises the at least one processor configured to:
   perform optical character recognition on the image to identify text in the portion of the document; and
   identify the source document based at least in part on a portion of the text.

* * * * *